United States Patent [19]

Burke et al.

[11] Patent Number: 4,599,506
[45] Date of Patent: Jul. 8, 1986

[54] VISUAL OBSERVATION OF WELDING OPERATION

[75] Inventors: Michael A. Burke; Israel Stol, both of Pittsburgh, Pa.

[73] Assignee: Westinghouse Electric Corp., Pittsburgh, Pa.

[21] Appl. No.: 678,523

[22] Filed: Dec. 5, 1984

[51] Int. Cl.⁴ .............................................. B23K 9/10
[52] U.S. Cl. .......................... 219/130.01; 219/124.34
[58] Field of Search ....................... 219/130.01, 124.34

[56] References Cited

U.S. PATENT DOCUMENTS

| | | |
|---|---|---|
| 3,021,386 | 2/1962 | Clark . |
| 3,526,748 | 9/1970 | Rienks . |
| 3,532,807 | 10/1970 | Webb . |
| 4,093,844 | 6/1978 | Fellure . |
| 4,168,430 | 9/1979 | Denis . |
| 4,183,055 | 1/1980 | Burkhardt, Jr. . |
| 4,225,771 | 9/1980 | Justice . |
| 4,280,137 | 7/1981 | Ashida . |
| 4,417,127 | 11/1983 | Nachey et al. ................. 219/124.34 |
| 4,432,286 | 2/1984 | Witte . |
| 4,488,032 | 12/1984 | Case, Jr. et al. ............... 219/124.34 |
| 4,491,715 | 1/1985 | Voronin et al. ................ 219/124.34 |
| 4,491,719 | 1/1985 | Corby, Jr. ..................... 219/124.34 |
| 4,532,405 | 7/1985 | Corby, Jr. et al. ............. 219/124.34 |
| 4,532,408 | 7/1985 | Richardson ................... 219/130.01 |

FOREIGN PATENT DOCUMENTS 56-26676 3/1981 Japan ............................ 219/124.34

Primary Examiner—Clifford C. Shaw
Attorney, Agent, or Firm—Daniel C. Abeles

[57] ABSTRACT

A visual observation system for monitoring a welding operation being performed in a welding region by a welding torch, the torch having a longitudinal axis and including a housing. The system is composed of a closed light conducting channel supported by the torch and having a first end directed toward the welding region and a second end remote from the first end, and image generating device disposed at the second end of the channel for receiving light entering the channel via the first end in order to generate an image of the scene in front of the first end, a transpatent plate disposed in, and blocking, the light conducting channel for protecting the image generating device against soiling by particles produced by the welding operation, and elements for producing a flow of inert gas past the side of the transparent plate directed toward the first end for opposing the deposition of such particles on the plate. The a light conducting channel is dimensioned such that in at least one direction transverse to the longitudinal axis of the torch, the channel does not project beyond the torch housing.

12 Claims, 3 Drawing Figures

VISUAL OBSERVATION OF WELDING OPERATION

BACKGROUND OF THE INVENTION

The present invention relates to a visual observation system for permitting direct, real-time observation of the weld pool created during operation of a welding torch.

It is known to be desirable to observe such weld pool during a welding operation, and various proposals to this end have heretofore been made. The systems previously proposed have a number of drawbacks, including exposure of delicate and expensive optical components to soiling and damage occasioned by the welding operation itself and cumbersome configurations which interfere with movement of the welding torch, particularly in confined spaces.

SUMMARY OF THE INVENTION

It is an object of the present invention to provide a visual observation system in which the expensive optical components are fully protected against soiling and damage and which is constructed so that it constitutes a minimum obstacle to movement of the welding torch.

Another object of the invention is to permit a full range of adjustments of the field of view of the observation system.

A further object of the invention is to provide a compact visual observation system which is adaptable to all types of robotic control systems.

A further object of the invention is to permit rapid replacement of the components which serve to protect the optical elements.

Yet another object of the invention is to permit more precise and rapid control of a welding operation than that permitted by the previously proposed fiber-optical observation systems.

Yet a further object of the invention is to permit considerable latitude in the positioning of the image forming device, which is typically a television camera or solid-state imaging device.

The above and other objects are achieved according to the invention by a visual observation system for monitoring a welding operation being performed in a welding region by a welding torch, the torch having a longitudinal axis and including a housing, the system including:

means defining a closed light conducting channel supported by the torch and having a first end directed toward the welding region and a second end remote from the first end;

image generating means disposed at the second end of the channel for receiving light entering the channel via the first end in order to generate an image of the scene in front of the first end;

means for protecting the image generating means against soiling by particles produced by the welding operation and comprising a transparent plate disposed in, and blocking, the light conducting channel; and means for producing a flow of inert gas past the side of the transparent plate directed toward the first end for opposing the deposition of such particles on the plate;

wherein the means defining a light conducting channel are dimensioned such that in at least one direction transverse to the longitudinal axis of the torch, the channel does not project beyond the torch housing.

The novel system according to the invention enables an image of the weld pool to be conducted to the television camera, or other image forming device, at a location above the welding torch to thereby provide robot flexibility as well as protection for the image forming device. The protection system according to the invention makes advantageous use of disposable transparent windows and additionally provides protective gas flows which reduce the rate at which the windows become soiled, and thereby increase their useful life.

The result is a reliable, rugged system which enables vision-based control to be incorporated into a robotic welder. In particular, the invention permits the weld fusion zone and the region just ahead of that zone to be viewed in real time in order to permit robotic real-time control of the welding operation.

The entire system according to the invention can be incorporated into the end effector of a robotic welding unit with no loss of flexibility or access capability over existing units which operate without such visual observation capability. An auxiliary light source can be incorporated into embodiments of the invention if required to overcome arc glare. However, the system according to the invention is not restricted to the visible region of the radiation spectrum, but can be made responsive to other types of radiation, e.g. the system could be constructed to effect infrared imaging.

The systems according to the present invention provide an enclosed light path which can be given any configuration necessary to adapt it to the particular welding system through the use of mirrors, prisms, lenses or collimated optical fiber bundles to conduct an image from the weld fusion zone and surrounding regions to a video imaging device or other electro-optical sensor mounted above the welding torch. This permits the imaging device or other type of sensor to be protected from accidental damage and to not obstruct movement of the welding torch during positioning. Systems according to the invention can be readily constructed to create very little impediment to movement or positioning of the welding torch.

According to a particular embodiment of the invention, viewing can be effected along the torch axis so that the torch is utilized to block out the arc image. This method of viewing was developed in the course of research at the Ohio State University.

It is known that during welding, and particularly during GMA welding, metal spatter particles and smoke particles will condense on surfaces close to the welding arc. Such particles could damage optical components located in the region of the arc. However, close-up viewing of the welding arc region is required to produce the desired visual control and to ensure that the flexibility of the system is not impaired. The present invention permits these objectives to be achieved in an advantageous manner as a result of the dual protection of the optical path, including protective windows which provide primary protection for the more expensive optical components and the protective gas flows which extend to useful life of the protective windows.

The invention permits the production of systems which are compact and adaptable to virtually all robotic designs, and which are small enough to avoid interfering with the mobility and flexibility of a robotic welding arrangement. Various embodiments of the invention permit the weld region to be viewed from any desired orientation, including a position which is "through the torch". Moreover, the system is quite rugged and positioning of the camera itself above the torch places this compnent, which is the most expensive component of the system, in the safest position.

Systems according to the invention can be supplemented with an auxiliary light source without significantly impairing operating flexibility.

In preferred embodiments of the invention, the protective windows can be removed and replaced rapidly, so that this operation minimizes stoppages of the welding operation.

The image analysis permitted by systems according to the invention eliminates problems which are encountered when optical fibers are used to transmit the image from the weld pool to an optical transducer, which problems result in longer processing times. Moreover, the system according to the invention permits a more precise and rapid visual control of the welding operation than does a fiber-optic system.

DESCRIPTION OF THE PREFERRED EMBODIMENTS

Figure 1:
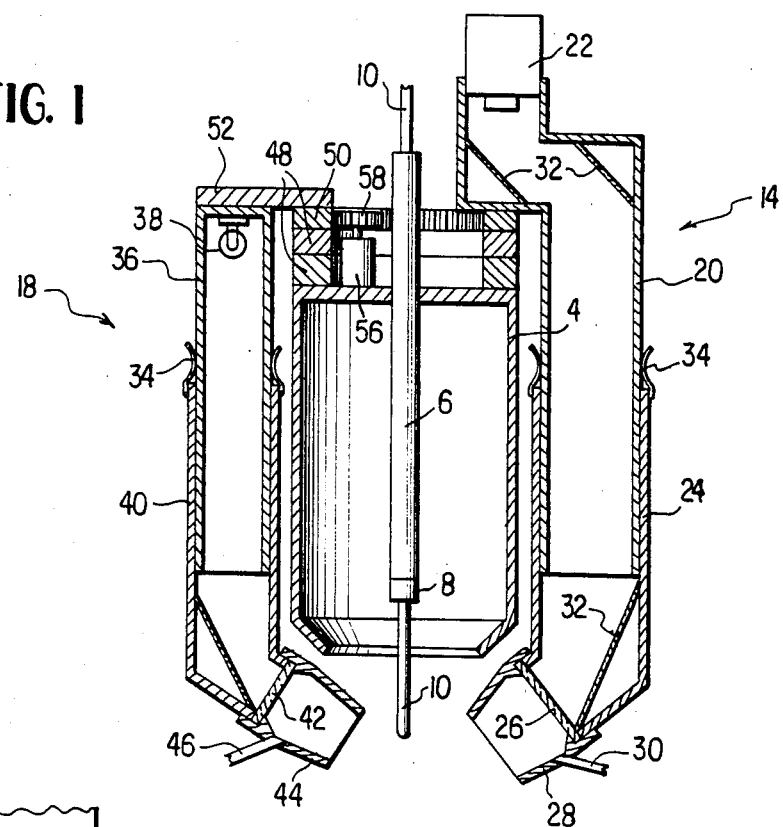
FIG. 1 is an elevational, cross-sectional view of a first preferred embodiment of the invention.

FIG. 1 shows a first embodiment of the viewing system according to the invention mounted on a welding torch. The torch is composed of a cylindrical housing 4 supporting, at its upper end, a wire guiding tube 6. Tube 6 carries, at its lower end, an electric contact lip 8. A welding filler wire 10 extends through, and is guided by, tube 6, the lower end of wire 10 being heated, during welding, to form a weld joint, and the wire being advanced through tube 6.

The viewing system is mounted on housing 4 and includes a camera assembly 14 and a light source assembly 18.

Camera assembly 14 is composed of a support tube 20, which may be of rectangular or circular cross section, carrying a television camera 22 at its upper end. Camera assembly 14 further includes a lower tube 24 slidably mounted on tube 20 and provided at its lower end with a protective window 26. Fitted over the lower end of tube 24 is a gas directing shield 28 having a generally conical form and carrying a gas inlet tube 30. Shield 28 can conveniently be removably force-fitted onto the lower end of tube 24 and is provided internally with a retaining ring for holding window 26 in place against the lower end of tube 24. This arrangement permits a rapid and simple replacement of window 26. The viewing direction defined by the lower end of tube 24 and shield 28 is inclined to the axial direction of the main portion of assembly 14 and the upper end of tube 20 is laterally offset from its lower end. Therefore, in order to conduct light from the scene to be viewed to the objective of camera tube 22, the interior of assembly 14 is provided with a plurality of properly oriented mirrors 32.

Lower tube 24 is clamped to support tube 20 by two or more spring members 34 which enable tube 24 to be adjusted vertically relative to tube 20, while assuring that the desired relative position between the tubes is maintained after adjustment. The purpose of this adjustment operation is to estblish the desired field of view for television camera 22.

Light source assembly 18 includes a support tube 36 which is also supported by housing 4, tube 36 having a light source 38 at its upper end.

Assembly 18 further includes a lower tube 40 carried by tube 36 in the same manner that tube 24 is carried by tube 20, tube 40 similarly being provided with two or more spring members 34 which serve the same purpose as the spring members 34 carried by tube 24.

Lower tube 40 is provided, at its lower end, with a protective window 42 performing the same function as window 26. Tube 40 additionally carries, at its lower end, a gas directing shield 44 mounted in the same manner, and performing the same function, as shield 22. A gas inlet tube 46 extends through shield 44.

Assemblies 14 and 18 are mounted at the top of torch housing 4 through the intermediary of an annular ring bearing 48 having a lower member secured to housing 4 and an upper member which is rotatable relative to the lower member. An annular, internally-toothed ring gear 50 is secured to the upper member of bearing 48 to directly support assembly 14 and to support assembly 18 via a support plate 52 secured, as by welding, to both ring gear 50 and the upper end of support tube 36.

Also mounted on the upper surface of torch housing 4 is a drive motor 56 whose output shaft carries a gear wheel 58 that meshes with the gear teeth on ring gear 50. Thus, operation of motor 56 will effect rotation of assemblies 14 and 18 about the axis of housing 4, and particularly about the axis of filler wire 10.

While camera 22 is disposed essentially above housing 4, where it is in a protected position, the various components are mounted to permit axial feeding of filler wire 10.

Figure 2:
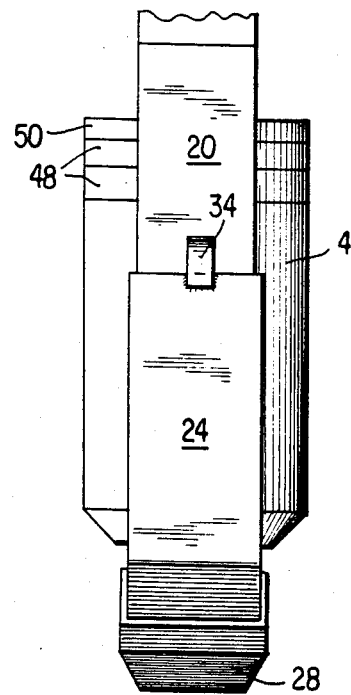
FIG. 2 is a side elevational view of the embodiment of FIG. 1.

The illustrated assembly, while it fully protects both the camera 22 and the light source 38 against soiling during the welding operation, is relatively compact, and therefore represents a minimum obstacle to movement of the welding torch in a confined area. In fact, as shown in FIG. 2, the lateral dimension of assemblies 14 and 18 is smaller, in one direction, than the corresponding transverse dimension of housing 4 so that assemblies 14 and 18 can be given any desired orientation to permit the welding torch to move close to an obstacle. In other words, with respect to at least one welding direction, the visual observation system according to the invention does not add to the space required by the welding torch itself.

When a torch equipped with a system according to the invention is to be placed in operation, lower tubes 24 and 40 can initially be adjusted to assure proper illumination and viewing of the welding region, and assemblies 14 and 18 can be rotated about the axis of wire 10 into the desired initial orientation. During the course of a welding operation, whenever the welding direction should change, assemblies 14 and 18 can be correspondingly rotated, by operation of motor 56, to assure that the desired viewing direction is always maintained. To this end, motor 56 can be connected to the welding control system to be operated in a preprogrammed manner on the basis of the programmed movements of the welding torch. During a welding operation, an inert gas, such as argon, is caused to flow through inlet tubes 30 and 46 at a flow rate selected to effectively prevent smoke particles and small metal particles produced during the welding operation from accumulating on windows 26 and 42. Thus, not only are the various optical components protected by the windows, but the useful life of the windows is extended by the inert gas flows.

According to a modification of the embodiment illustrated in FIG. 1, the various mirrors could be replaced by a collimated bundle of optical fibers extending from window 26 to camera 22 and/or a bundle of collimated optical fibers extending from window 42 to light source 38. If optical fibers are employed, the vertical adjustability of the associated assembly might be eliminated.

According to a further modification of the invention, the two upper mirrors 32 could be eliminated and tube 20 could be modified so that the optical axis of television camera 22 is aligned with the axis of tube 20. While this would simplify the overall structure, it would place camera 22 in a somewhat less protected position.

Figure 3:
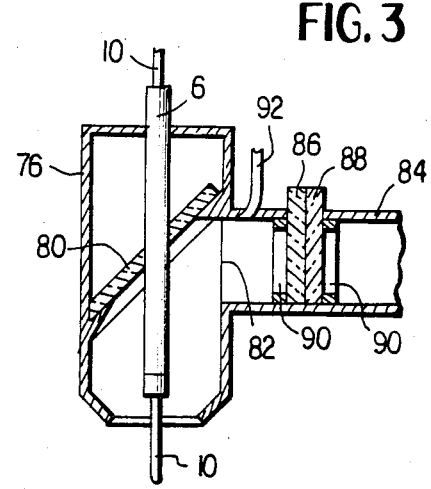
FIG. 3 is an elevational, cross-sectional view of a second preferred embodiment of the invention.

According to another embodiment of the invention, as shown in FIG. 3, the visual observation system could be constructed to view the welding operation along the axis of the welding torch, to utilize the torch, and more specifically wire 10, to block out the arc image. For this purpose, torch housing 76 is provided internally with a mirror 80 having a reflecting surface inclined at an angle of 45° to the axis of wire 10. In this embodiment, the interior of housing 76 is provided with a ledge for supporting mirror 80 and mirror 80 is provided a central opening for passage of guide tube 6.

In addition, housing 76 is provided with a lateral opening 82 via which light reflected from mirror 80 is conducted to an optical viewing port 84 at the remote end of which (not shown) the television camera is disposed.

A protective window 86 and an optical filter 88 are disposed in viewing port 84 and are held in place by ring members 90 secured within port 84. As shown, port 84 is provided with a slot at its top through which window 86 and filter 88 project so that these elements can be readily replaced whenever window 86 becomes soiled and/or an optical filter having different different radiation transmission properties is desired. In the vicinity of inlet opening 82, port 84 is provided with a gas inlet tube 92 for introduction of an inert gas, e.g. argon, at a flow rate sufficient to at least retard the soiling of the exposed surfaces of mirror 80 and protective window 86 by particles resulting from the welding operation.

Since the field of view of this system is the same regardless of the orientation of housing 76 about the torch axis, the viewing system need not be rotated for viewing purposes. However, this system creates a minimum obstacle to movement of the torch and housing 76 can be pivoted during a welding operation to place port 84 in a position in which it will not interfere with movement of the torch in a confined region.

If desired, the optical axis of the television camera can be offset and/or inclined to the axis of port 84, in which case a suitable arrangement of mirrors or a bundle of collimated optical fibers can be provided in port 84 to direct light from the scene being viewed to the television camera objective lens.

If needed, an illumination arrangement like that of FIG. 1, or an arrangement for supplying illumination via port 84, or some other known illumination arrangement can be provided.

In both illustrated embodiments of the invention, the torch itself, together with the visual observation system, can be mounted on the arm of a suitable robotic welding and control system.

It will be understood that the above description of the present invention is susceptible to various modifications, changes and adaptations, and the same are intended to be comprehended within the meaning and range of equivalents of the appended claims.

We claim:

1. A visual observation system for monitoring a welding operation being performed in a welding region by a welding torch, the torch having a longitudinal axis and including a housing, said system comprising:

means defining a closed light conducting channel supported by the torch, laterally spaced from the longitudinal axis of the torch and having a first end directed toward the welding region and a second end remote from the first end, said means defining a closed light conducting channel being oriented such that said first and second ends are spaced apart in the direction of the longitudinal axis of the torch and the welding region is laterally offset from said first end of said light conducting channel, so that said closed light conducting channel has a field of view which is directed at an acute angle to the longitudinal axis of the welding torch;

said means defining a closed light conducting channel being composed of a first tubular member extending from said second end, a second tubular member extending from said first end and light directing means mounted in said second tubular member at said first end of said channel for deflecting light from the welding region to said second end of said channel, said second member being slidably mounted on said first member for permitting adjustment of the distance between said first and second ends in order to displace the field of view of said closed light conducting channel;

image generating means disposed at said second end of said channel for receiving light entering said channel via said first end in order to generate an image of the scene in front of said first end; and means for protecting said image generating means against soiling by particles produced by the welding operation and comprising a transparent plate disposed in, and blocking, said light conducting channel;

wherein said means defining a light conducting channel are dimensioned such that in at least one direction transverse to the longitudinal axis of the torch, said channel does not project beyond the torch housing.

2. A system as defined in claim 1 wherein said means defining a closed light conducting channel further comprise a rotatable support member mounted on the torch housing and supporting said first tubular member for rotating said channel about the longitudinal axis of the torch.

3. A system as defined in claim 1 further comprising a first conical tubular member removably secured to said channel at said first end thereof and tapering away from said first end, and a gas inlet tube carried by said conical tubular member and opening into the region enclosed thereby for producing a flow of inert gas past the side of said transparent plate directed toward said first end for opposing the deposition of such particles on said plate.

4. A system as defined in claim 1, further comprising illuminating means supported by the torch and defining a second closed light conducting channel having a first end directed toward the welding region and a second end remote from said first end, and a light source mounted in said second channel for illuminating the welding region.

5. A visual observation system for monitoring a welding operation being performed in a welding region by a welding torch, the torch having a longitudinal axis and including a housing, said system comprising:

means defining a first closed light conducting channel having a first end directed toward the welding region and a second end remote from said first end, and composed of a first tubular member extending from said second end, a second tubular member extending from said first end and slidably mounted on said first member for permitting adjustment of the distance between said first and second ends, a rotatable support member mounted on the torch housing and supporting said first tubular member for rotating said first channel about the longitudinal axis of the torch, and light directing means within said channel for directing light from said first end to said second end, said means defining a channel being located adjacent the torch housing, being oriented such that said first and second ends are spaced apart in the direction of the longitudinal axis of the torch, and being dimensioned such that, in at least one direction transverse to the longitudinal axis of the torch, said channel does not project beyond the torch housing;

video image generating means mounted on said first tubular member at said second end of said channel for receiving light entering said channel via said first end in order to produce an image of the scene in front of said first end;

means constituted by a transparent plate removably disposed in, and blocking, said channel for protecting said image generating means against soiling by particles produced by the welding operation;

means for producing a flow of inert gas past the side of said transparent plate facing away from said image generating means for opposing the deposition of such particles on said plate, and composed of a first conical tubular member removably secured to said second tubular member at said first end of said channel and tapering away from said first end, and a gas inlet tube carried by said first conical tubular member and opening into the region enclosed by said first conical tubular member;

illuminating means supported by the torch and defining a second closed light conducting channel having a first end directed toward the welding region and a second end remote from said first end, said illuminating means comprising a third tubular member carried by said rotatable support member and extending from said second end of said second channel, a fourth tubular member extending from said first end and slidably mounted on said third tubular member for permitting adjustment of the distance between said first and second ends of said second channel, and a light source mounted in said second channel for illuminating the welding region;

a second transparent plate removably disposed in, and blocking, said second channel, at said first end thereof, for protecting said light source against soiling by such particles;

means for producing a flow of inert gas past the side of said second transparent plate facing away from said light source for opposing the deposition of such particles on said second plate, and composed of a second conical tubular member removably secured to said fourth tubular member at said first end of said second channel and tapering away from said first end, and a second gas inlet tube carried by said second conical tubular member and opening into the region enclosed by said second conical tubular member; and externally controllable rotation means mounted on the torch housing and operatively associated with said rotatable support member for rotating said first and second channels about the longitudinal axis of the torch.

6. A visual observation system for monitoring a welding operation being performed in a welding region by a welding torch, the torch having a longitudinal axis and including a housing, said system comprising:

means defining a first closed light conducting channel supported by the torch and located alongside the torch housing and having a first end directed toward the welding region and a second end remote from the first end, said first end of said first channel being laterally offset from the longitudinal axis of the torch for establishing a field of view for said first channel which is directed transversely to the longitudinal axis of the torch;

image generating means disposed at said second end of said first channel for receiving light entering said first channel via said first end in order to generate an image of the scene in front of said first end;

means for protecting said image generating means against soiling by particles produced by the welding operation and comprising a transparent plate disposed in, and blocking, said first light conducting channel;

means for producing a flow if inert gas past the side of said transparent plate directed toward said first end for opposing the deposition of such particles on said plate;

illuminating means supported by the torch and located alongside the torch housing and defining a second closed light conducting channel having a first end directed toward the welding region and a second end remote from said first end, and a light source mounted in said second channel for illuminating the welding region;

wherein said means defining said first and second light conducting channels are dimensioned such that in at least one direction transverse to the longitudinal axis of the torch, each said channel does not project beyond the torch housing.

7. A system as defined in claim 6, further comprising a second transparent plate removably disposed in, and blocking, said second channel, at said first end thereof, for protecting said light source against soiling by particles produced by the welding operation, and means for producing a flow of inert gas past the side of said second transparent plate facing away from said light source for opposing the deposition of such particles on said second plate.

8. A system as defined in claim 7, wherein said means for producing a flow of inert gas past the side of said second transparent plate comprises a conical tubular member removably secured to said second channel at said first end thereof and tapering away from said first end, and a gas inlet tube carried by said conical tubular member and opening into the region enclosed by said conical tubular member.

9. A system as defined in claim 8, further comprising a rotatable support member mounted on the torch housing and supporting said first and second channels for rotating said first and second channels about the longitudinal axis of the torch.

10. A system as defined in claim 9 wherein said means defining a closed light conducting channel supported by the torch, said illuminating means and said support member are spaced laterally from the longitudinal axis of the torch to permit straight-line feeding of a welding filler wire into the torch.

11. A visual observation system for monitoring a welding operation being performed in a welding region by a welding torch, the torch having a longitudinal axis and including a housing, said system comprising:

means defining a first closed light conducting channel supported by the torch and having a first end directed toward the welding region and a second end remote from the first end;

image generating means disposed at said second end of said first channel for receiving light entering said first channel via said first end in order to generate an image of the scene in front of said first end;

means for protecting said image generating means against soiling by particles produced by the welding operation and comprising a transparent plate disposed in, and blocking, said first light conducting channel;

means for producing a flow of inert gas past the side of said transparent plate directed toward said first end for opposing the deposition of such particles on said plate;

illuminating means supported by the torch and defining a second closed light conducting channel having a first end directed toward the welding region and a second end remote from said first end, and a light source mounted in said second channel for illuminating the welding region; and a rotatable support member mounted on the torch housing and supporting said first and second channels for rotating said first and second channels about the longitudinal axis of the torch;

wherein said means defining said first and second light conducting channels are dimensioned such that in at least one direction transverse to the longitudinal axis of the torch, each said channel does not project beyond the torch housing.

12. A system as defined in claim 11 wherein said means defining a closed light conducting channel supported by the torch, said illuminating means and said support member are spaced laterally from the longitudinal axis of the torch to permit straight-line feeding of a welding filler wire into the torch.

* * * * *